(12) United States Patent
Ikhlef et al.

(10) Patent No.: US 7,825,370 B2
(45) Date of Patent: Nov. 2, 2010

(54) METHOD AND SYSTEM FOR CALIBRATING A COMPUTED TOMOGRAPHY SYSTEM

(75) Inventors: Abdelaziz Ikhlef, Waukesha, WI (US); Yasuhiro Imai, Tokyo (JP)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 11/159,706

(22) Filed: Jun. 23, 2005

(65) Prior Publication Data

US 2006/0289765 A1 Dec. 28, 2006

(51) Int. Cl.
*G12B 13/00* (2006.01)
(52) U.S. Cl. .................................................. 250/252.1
(58) Field of Classification Search .............. 250/252.1; 702/194, 195, FOR. 160, FOR. 157
See application file for complete search history.

(56) References Cited

U.S. PATENT DOCUMENTS

| 4,897,788 | A | * | 1/1990 | King | 378/12 |
| 5,764,720 | A | * | 6/1998 | Besson | 378/4 |
| 5,828,719 | A | * | 10/1998 | He et al. | 378/4 |
| 2007/0023668 | A1 | * | 2/2007 | Dhurjaty et al. | 250/370.09 |

\* cited by examiner

*Primary Examiner*—David P Porta
*Assistant Examiner*—David S Baker
(74) *Attorney, Agent, or Firm*—Armstrong Teasdale LLP

(57) ABSTRACT

Methods and systems for calibrating a Computed Tomography (CT) system are provided. The method includes selectively activating each of a plurality of elements of a detector in the CT system. The method further includes determining for each of the selectively activated elements, a crosstalk effect on elements adjacent to the activated elements, to calibrate the CT system.

20 Claims, 12 Drawing Sheets

|  | Slice 1 | Slice 2 | Slice 3 | Slice 4 | Slice 5 | Slice 6 | . | . | . | . | . | Slice 60 | Slice 61 | Slice 62 | Slice 63 | Slice 64 |
|---|---|---|---|---|---|---|---|---|---|---|---|---|---|---|---|---|
| . | . | . | . | . | . | . | . | . | . | . | . | . | . | . | . | . |
| . | 0.00 | 2.90 | 2.81 | 2.98 | 2.93 | 3.10 | . | . | . | . | . | 3.78 | 3.80 | 3.92 | 3.92 | 3.56 |
| . | 0.00 | 2.87 | 2.86 | 3.02 | 2.93 | 3.26 | . | . | . | . | . | 3.82 | 3.77 | 3.95 | 3.90 | 3.60 |
| ch 73 | 0.00 | 2.86 | 2.88 | 2.94 | 3.01 | 3.04 | . | . | . | . | . | 3.82 | 3.66 | 4.02 | 3.93 | 3.54 |
| ch 74 | 0.00 | 2.88 | 2.85 | 2.92 | 3.02 | 3.07 | . | . | . | . | . | 3.86 | 3.73 | 3.96 | 3.92 | 3.56 |
| ch 75 | 0.00 | 2.87 | 2.83 | 3.01 | 2.98 | 3.09 | . | . | . | . | . | 3.83 | 3.73 | 3.93 | 3.89 | 3.57 |
| ch 76 | 0.00 | 2.85 | 2.84 | 2.99 | 2.95 | 3.24 | . | . | . | . | . | 3.81 | 3.72 | 3.92 | 3.80 | 3.63 |
| ch 77 | 0.00 | 2.88 | 2.92 | 2.95 | 3.09 | 2.84 | . | . | . | . | . | 3.84 | 3.69 | 4.04 | 3.86 | 3.63 |
| ch 78 | 0.00 | 2.87 | 2.85 | 2.93 | 3.03 | 2.82 | . | . | . | . | . | 3.82 | 3.67 | 3.94 | 3.81 | 3.56 |
| ch 79 | 0.00 | 2.88 | 2.86 | 3.01 | 2.98 | 2.89 | . | . | . | . | . | 3.79 | 3.72 | 3.95 | 3.81 | 3.65 |
| . | 0.00 | 2.86 | 2.92 | 3.07 | 2.97 | 3.09 | . | . | . | . | . | 3.80 | 3.71 | 3.85 | 3.72 | 3.70 |
| . | . | . | . | . | . | . | . | . | . | . | . | . | . | . | . | . |

FIG. 9

|  | Slice 1 | Slice 2 | Slice 3 | Slice 4 | Slice 5 | Slice 6 | . | . | . | . | . | Slice 60 | Slice 61 | Slice 62 | Slice 63 | Slice 64 |
|---|---|---|---|---|---|---|---|---|---|---|---|---|---|---|---|---|
| . | . | . | . | . | . | . | . | . | . | . | . | . | . | . | . | . |
| . | 3.84 | 3.70 | 3.73 | 3.67 | 3.91 | 3.72 | . | . | . | . | . | 3.10 | 2.93 | 3.01 | 2.85 | 0.00 |
| . | 3.80 | 3.70 | 3.71 | 3.65 | 3.88 | 3.74 | . | . | . | . | . | 3.06 | 2.98 | 2.99 | 2.86 | 0.00 |
| ch 73 | 3.76 | 3.71 | 3.56 | 3.70 | 3.81 | 3.73 | . | . | . | . | . | 3.04 | 2.98 | 2.95 | 2.84 | 0.00 |
| ch 74 | 3.79 | 3.67 | 3.65 | 3.70 | 3.66 | 3.90 | . | . | . | . | . | 3.08 | 3.02 | 2.98 | 2.81 | 0.00 |
| ch 75 | 3.82 | 3.58 | 3.68 | 3.96 | 3.88 | 3.62 | . | . | . | . | . | 3.03 | 2.94 | 2.93 | 2.89 | 0.00 |
| ch 76 | 3.80 | 3.59 | 3.74 | 3.87 | 3.88 | 3.68 | . | . | . | . | . | 2.99 | 3.03 | 2.95 | 2.91 | 0.00 |
| ch 77 | 3.76 | 3.61 | 3.57 | 3.93 | 3.83 | 3.68 | . | . | . | . | . | 2.94 | 2.99 | 2.90 | 2.92 | 0.00 |
| ch 78 | 3.73 | 3.54 | 3.50 | 3.86 | 3.62 | 3.81 | . | . | . | . | . | 2.87 | 3.00 | 2.87 | 2.88 | 0.00 |
| ch 79 | 3.74 | 3.50 | 3.66 | 3.78 | 3.88 | 3.59 | . | . | . | . | . | 2.94 | 2.92 | 2.84 | 3.13 | 0.00 |
| . | . | . | . | . | . | . | . | . | . | . | . | . | . | . | . | . |
| . | . | . | . | . | . | . | . | . | . | . | . | . | . | . | . | . |

FIG. 10

$$
\begin{pmatrix} S(ch,1) \\ \bullet \\ \bullet \\ S(ch,R) \\ \bullet \\ \bullet \\ \bullet \\ S(ch,64) \end{pmatrix}
=
[e]
\begin{pmatrix} 1-e_N(2,1)-e_S(1,2), & e_N(2,1), & 0, & \ldots & 0, & 0, & 0 \\ & & & & & & \\ 0,\ldots 0, & e_S(R-1,R), & \ldots, & & & & \\ 0,\ldots 0,0, & \ldots & e_S(R-1,R), & 1-e_N(R,R-1)-e_S(R,R+1), & e_N(R+1,R), & 0, & \ldots 0 \\ & & & & & & \\ 0, & 0, & 0, & \ldots & 0, & e_S(64,64), & 1-e_N(64,63)-e_S(63,64) \end{pmatrix}
\begin{pmatrix} D(ch,1) \\ \bullet \\ \bullet \\ D(ch,R) \\ \bullet \\ \bullet \\ \bullet \\ D(ch,64) \end{pmatrix}
$$

FIG. 12

METHOD AND SYSTEM FOR CALIBRATING A COMPUTED TOMOGRAPHY SYSTEM

BACKGROUND OF THE INVENTION

This invention relates generally to medical imaging systems, and more particularly, to methods and systems for calibrating a Computed Tomography (CT) system.

CT systems may be used for imaging tissues and bones in various body parts. A CT system generally includes an image acquisition component, a processor and a controller. The image acquisition component has an X-ray source and a detector. Each detector includes a plurality of elements. Each element includes a scintillation crystal and a photosensor. Some examples of photosensors include photodiode pixels and phototransistors. The photosensors are broadly based on two kinds of technologies, namely, front-illuminated and back-illuminated. The two technologies are mainly distinguished by whether the electrical signal to the photosensors is routed from the front or the rear of the photosensors.

The X-ray source directs X-ray beams through the object being scanned. These X-ray beams are attenuated by the object and are absorbed by the detector. The detector converts the X-ray radiation energy into electric signals. Ideally, the cumulative electric signal collected by the detector is linearly related to X-ray radiation energy that is absorbed by the detector. This criteria is fulfilled when requirements, such as, but not limited to, stability of the detector over time and temperature, sensitivity to focal spot motion and light output over life, are met. The electrical signals absorbed by the detector are reconstructed by the controller to form a CT image of the object.

With advancements in technology in CT systems, there has been a growing need for more precise calibrations and alignments. The calibrations in CT systems are used to remove artifacts from CT images. Artifacts such as smudges and center spots in CT images may be caused by crosstalk between the photosensors and/or the scintillation crystals (in a detector).

In a detector using back-illuminated photosensors, the elements of the detector are connected and aligned in two directions, for example, the x and z directions. The close proximity of the photosensors causes crosstalk in both these directions. With the higher number of slices in multi-slices detectors and thin slices, the crosstalk becomes an important parameter to optimize and control. The crosstalk in both x and z directions include an average crosstalk and a module-to-module crosstalk. The module-to-module (channel-to-channel) crosstalk may be attributed to non-identical relative behavior in detector elements (module). The non-identical relative behavior includes factors, such as, fluctuation in the scintillator behavior from one scintillator element of the detector to an adjacent scintillator element and the lateral diffusion of photocarriers in the material of the photosensors. The lateral diffusion of photocarriers in the material of the photosensors causes photosensor electrical crosstalk. This results in photocarriers diffusing out of the photosensor collection junction area in which the photocarriers are generated. These photocarriers are then collected by adjacent or neighboring photosensors. This effect is more likely in back-illuminated photosensors than in front-illuminated photosensors, as the thickness of the back-illuminated photosensors increases the diffusion length before the photosensor collection junction.

Module-to-module z-crosstalk is difficult to correct because of the photosensor alignment requirements of the back-illuminated photosensor. In case the scintillator cell is not aligned (or centered) to the diode active area, the crosstalk from that cell to its neighboring cell will be unbalanced and will cause image artifact when slope anatomy is imaged. At the same time, the amount of crosstalk coming from the neighboring cell to the non-centered cell will be unbalanced when a slope anatomy is imaged.

Further, the z-crosstalk error is one of the factors that cause smudges and band artifacts in CT images obtained for objects that change in thickness sharply in the z-direction.

Some known methods address the problem of crosstalk by aligning the scintillator array with the photosensors very accurately. This alignment requires a lot of accuracy in the mechanical dimensions of a scintillator and also needs to meet difficult-to-achieve tolerance requirements of the photosensor-scintillator alignment. Further, some known methods correct only one particular type of crosstalk and are unable to correct the others. For example, boosted reconstruction kernels correct the average crosstalk between the elements of the detector, but do not correct the other types of crosstalks such as differential crosstalk. In addition, known methods do not provide any robust solution for correcting image artifacts in the CT images of objects that have sharp slopes.

BRIEF DESCRIPTION OF THE INVENTION

In an exemplary embodiment of the invention, a method and system for calibrating a computed tomography (CT) system is provided. The method includes selectively activating each of a plurality of elements of a detector in the CT system. The method further includes determining for each of the selectively activated elements, a crosstalk effect on elements adjacent to the activated elements, to calibrate the CT system.

In yet another exemplary embodiment of the invention, a CT system is provided. The CT system includes an image acquisition component, a controller, and a processor. The image acquisition component includes at least one detector having a plurality of elements. The controller is configured to selectively activate each of the plurality of elements of the detector. The processor is configured to determine for each of the selectively activated elements, a crosstalk effect on adjacent elements of the detector, to calibrate the image acquisition component.

BRIEF DESCRIPTION OF THE DRAWINGS

FIGS. 9 and 10 are tables of collated sample z-crosstalk error values for the North and South directions, respectively, in accordance with FIG. 6 and FIG. 7, respectively.

FIG. 12 is a z-crosstalk matrix in accordance with various embodiments of the invention.

DETAILED DESCRIPTION OF THE INVENTION

Various embodiments of the invention provide a method and system for calibrating a Computed Tomography (CT) system. Further, various embodiments of the invention provide for correcting crosstalk between the photosensors in the elements of a detector (in the CT system). In various exemplary embodiments of the invention, the detector may be, for example, a VCT 64 detector, using multi-slice diodes arrays. The crosstalk correction is performed using average and differential crosstalk error values, which are determined prior to the generation of a CT image of an object. In various embodiments of the invention, the absolute and the channel-to-channel crosstalks in the x, z and the diagonal directions of the CT system are corrected by the various embodiments described herein.

Figure 1:
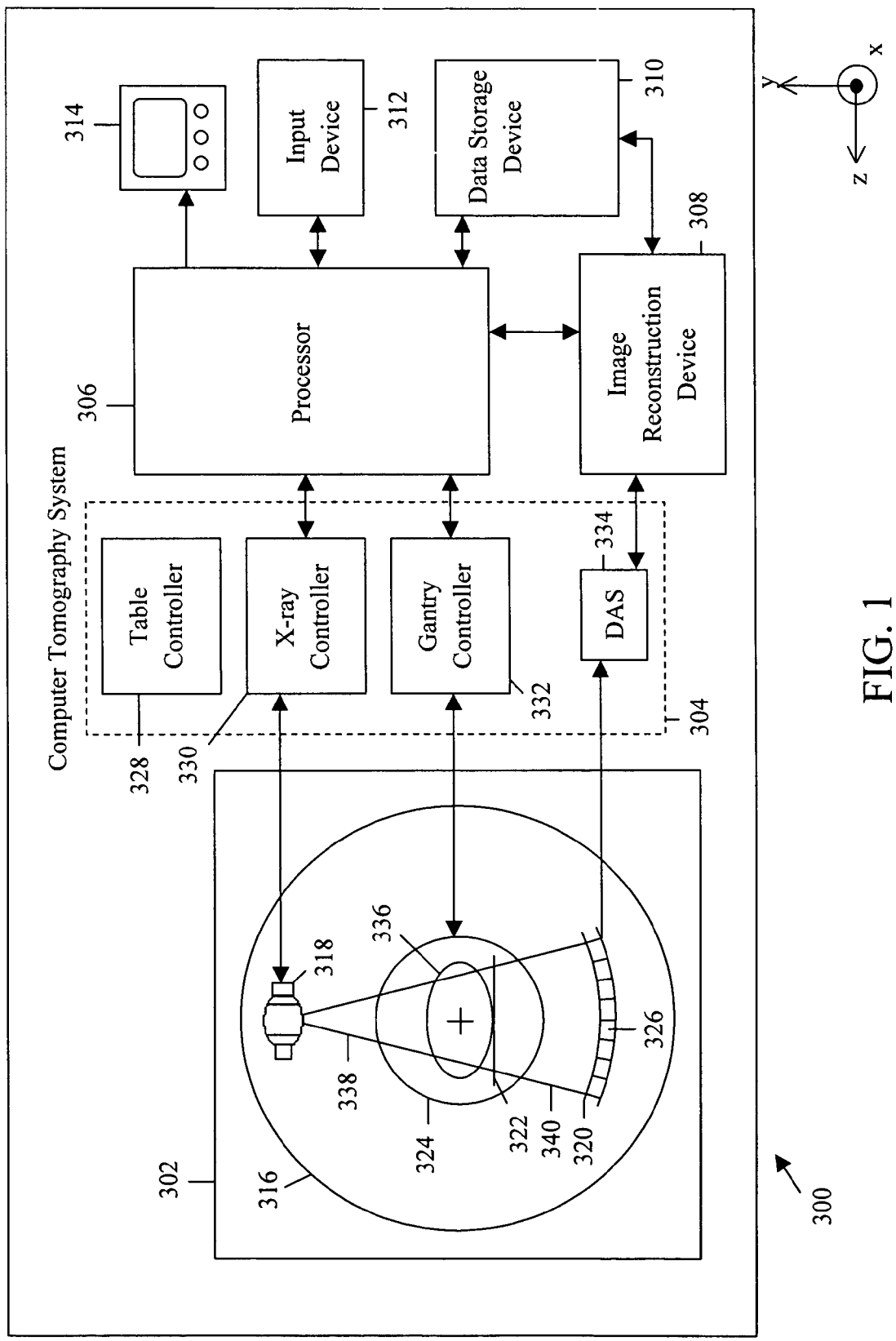
FIG. 1 is a block diagram of a CT system in accordance with an exemplary embodiment of the invention.

FIG. 1 is a block diagram of a CT system 300 in accordance with an exemplary embodiment of the invention. CT system 300 includes an image acquisition component 302, a controller 304, a processor 306, an image reconstruction device 308, a data storage device 310, an input device 312, and a display device 314. Image acquisition component 302 includes a gantry 316, an X-ray source 318, a detector 320, a table 322, and an object cavity 324 (e.g., a bore). Detector 320 includes a plurality of elements 326. Each element 326 includes at least one scintillation crystal and photosensor. Some examples of photosensors include, but are not limited to, photodiode pixels and phototransistors. Controller 304 includes a table controller 328, an X-ray controller 330, a gantry controller 332, and a data acquisition system (DAS) 334.

In various embodiments, X-ray source 318 and detector 320 are oppositely disposed in gantry 316 such that they are separated by object cavity 324. An object 336 is placed on table 322, and within object cavity 324. In an exemplary embodiment of the invention, X-ray source 318 and detector 320 are rotatingly disposed relative to gantry 316 and object 336. In another exemplary embodiment of the invention, X-ray source 318 and detector 320 remain stationary. X-ray source 318 projects an X-ray beam 338 toward detector 320. X-ray beam 338 is configured to pass through object 336. X-ray beam 338 is collimated to align X-ray beams 338 in an X-Y plane (of a Cartesian coordinate system), referred to as an "imaging plane". When X-ray beam 338 passes through object 336, X-ray beam 338 is attenuated by object 336. An attenuated X-ray beam 340 is absorbed by the scintillator crystals in elements 326 of detector 320. These scintillation crystals convert the absorbed X-rays into visible light. The photosensors in elements 326 convert this light into electric signals. Each photosensor produces an electrical signal proportional to the intensity of attenuated X-ray beam 340 received by that photo sensor.

Controller 304 is configured to selectively activate each element 326 in detector 320 with X-ray beam 338. Table controller 328 controls the axial and rotational movement, and direction of table 322. X-ray controller 330 provides power and timing signals to X-ray source 318. Gantry controller 332 controls the rotational speed and angular position of X-ray source 318. DAS 334 receives electrical signals produced by elements 326 and digitizes the signals for subsequent processing. The digitized signals are provided to image reconstruction device 308. Image reconstruction device 308 and processor 306 reconstruct a CT image from these signals. The reconstructed CT image is stored in data storage device 310. In one embodiment of the invention, data storage device 310 may also save any intermediately processed data during the formation of the CT image. In addition, image reconstruction device 308 determines the effect of crosstalk on the photosensors of elements 326 adjacent to the photosensors of the activated elements 326 in detector 320. Input device 312 is configured to receive manual inputs from a user of CT system 300. The CT image of object 336 is displayed by display device 314. In an exemplary embodiment of the invention, display device 314 is used to determine the calibration values of CT system 300.

In various embodiments of the invention, data storage device 310 may be a magnetic or an optical storage media, such as, but not limited to, a hard disk, a tape drive, a compact disc (CD), and a memory chip. In an exemplary embodiment of the invention, computer programs and other instructions may be uploaded into processor 306 through input device 312. Examples of input device 312 include, but are not limited to, keys/buttons, audio inputs, and video input devices. In various embodiments of the invention, display device 314 includes one of, but is not limited to, a cathode ray display, a Liquid Crystal Display (LCD), and plasma display.

Figure 2:
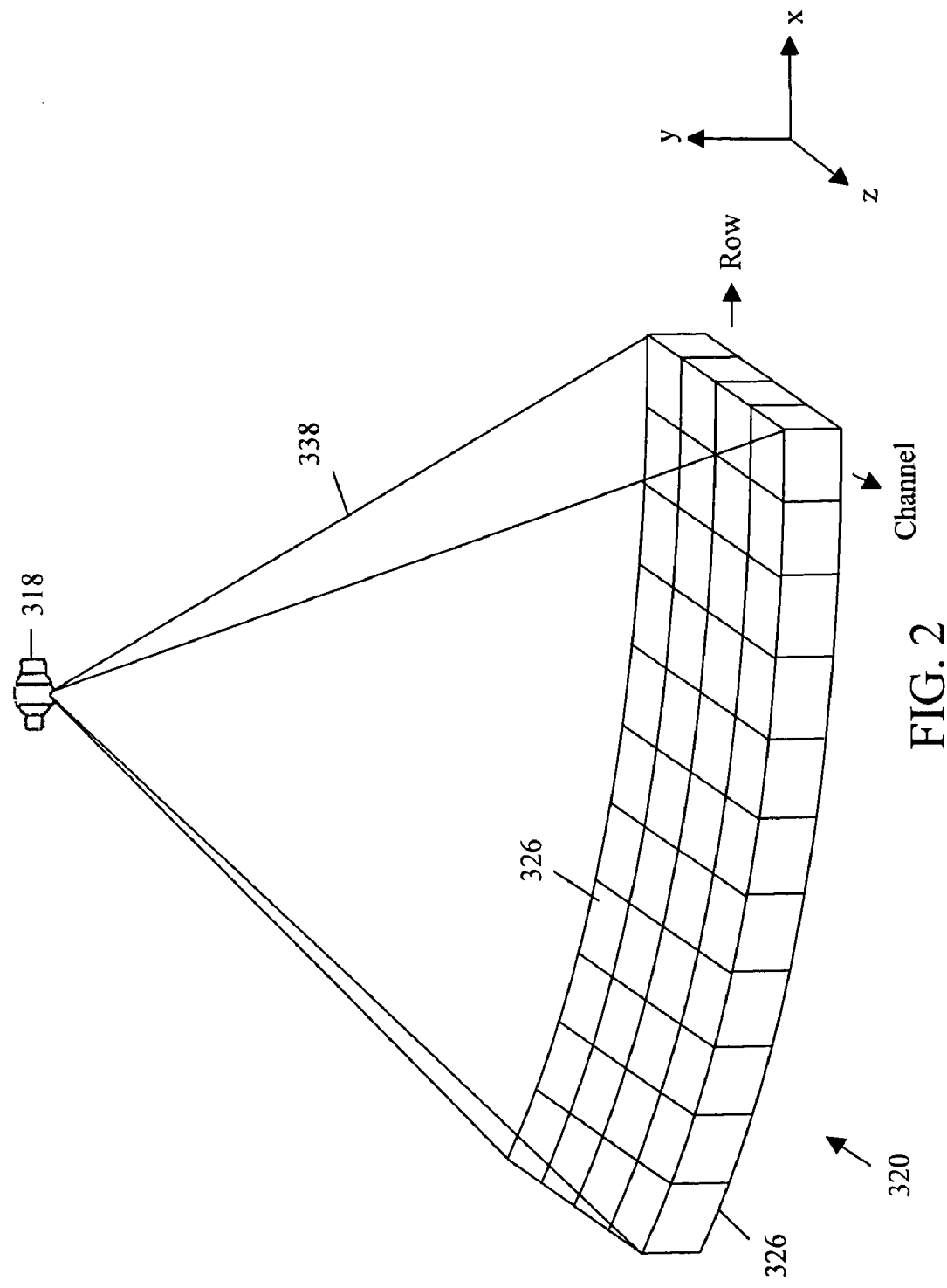
FIG. 2 is a diagram illustrating a detector present in a CT system, in accordance with FIG. 1.

FIG. 2 illustrates detector 320 in CT system 300, in accordance with FIG. 1. In an exemplary embodiment of the invention, detector 320 is configured as a multi-dimensional array of elements 326. Each element in the multi-dimensional array of elements 326 is hereinafter referred to as an element 326. In an embodiment of the invention, the array is configured as an arch length segment along the x direction and a linear segment along the z direction.

A collection of elements 326 along the arch length segment of detector 320 is hereinafter referred to as a channel. A collection of elements 326 along the linear depth of detector 320 is hereinafter referred to as a row. In an exemplary embodiment of the invention, the configuration of detector 320 includes N arrays of elements 326. Each array has 64 rows and 16 channels. 64 rows allow the imaging of object 336 in 64 slices, in the z direction. The thickness of each row is the slice thickness in the z direction.

In another embodiment of the invention, detector 320 may be configured as a combination of multi-dimensional arrays, in accordance with an exemplary embodiment of the invention. An example of such a configuration is the combination of a scintillator array and a photosensor array. The scintillator array includes a plurality of scintillator crystals arranged in an array. The photosensor array includes a plurality of photosensors arranged in an array identical in dimensions to the scintillator array. In alternate embodiments of the invention, detector 320 includes a scintillating medium across the length of detector 320. Detector 320 further includes a photosensor array that is aligned to the scintillating medium.

Figure 3:
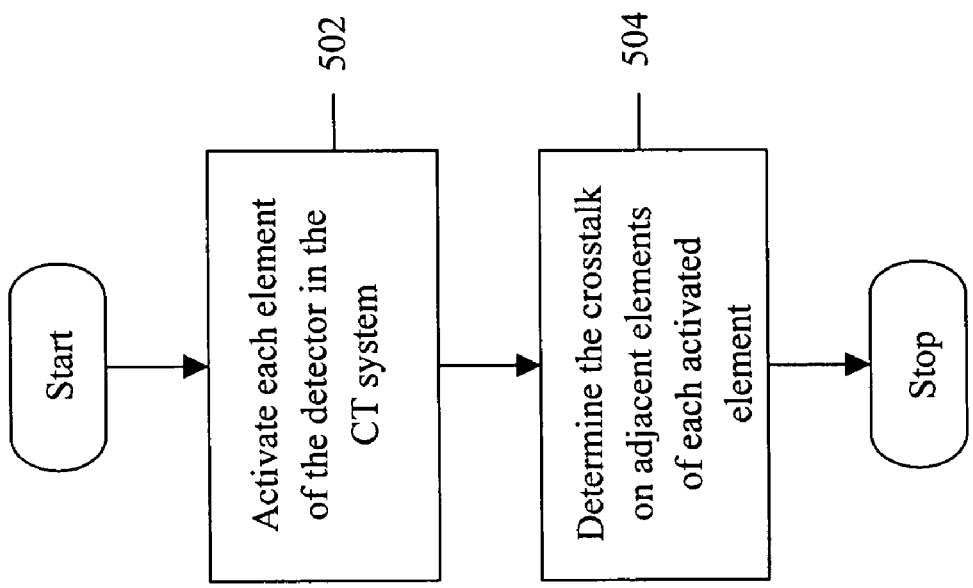
FIG. 3 is a flowchart of a method for calibrating a CT system, in accordance with an exemplary embodiment of the invention.

FIG. 3 is a flowchart of a method for calibrating CT system 300, in accordance with an exemplary embodiment of the invention. Specifically, the flowchart describes a method for measuring the z-crosstalk between various photosensors in elements 326 of detector 320. At 502, each element of the detector is selectively activated by X-rays. At 504, the effect on the photosensors of the elements adjacent to each activated element is measured. For example, the X-ray radiation directed towards a particular element may be spilt onto the photosensors of adjacent elements and is measured accordingly. The fraction of signal flowing from the activated pixel to its neighboring pixels is a measure of the crosstalk. If this fraction is known prior to imaging, one can correct the images for this artifact.

Figure 4:
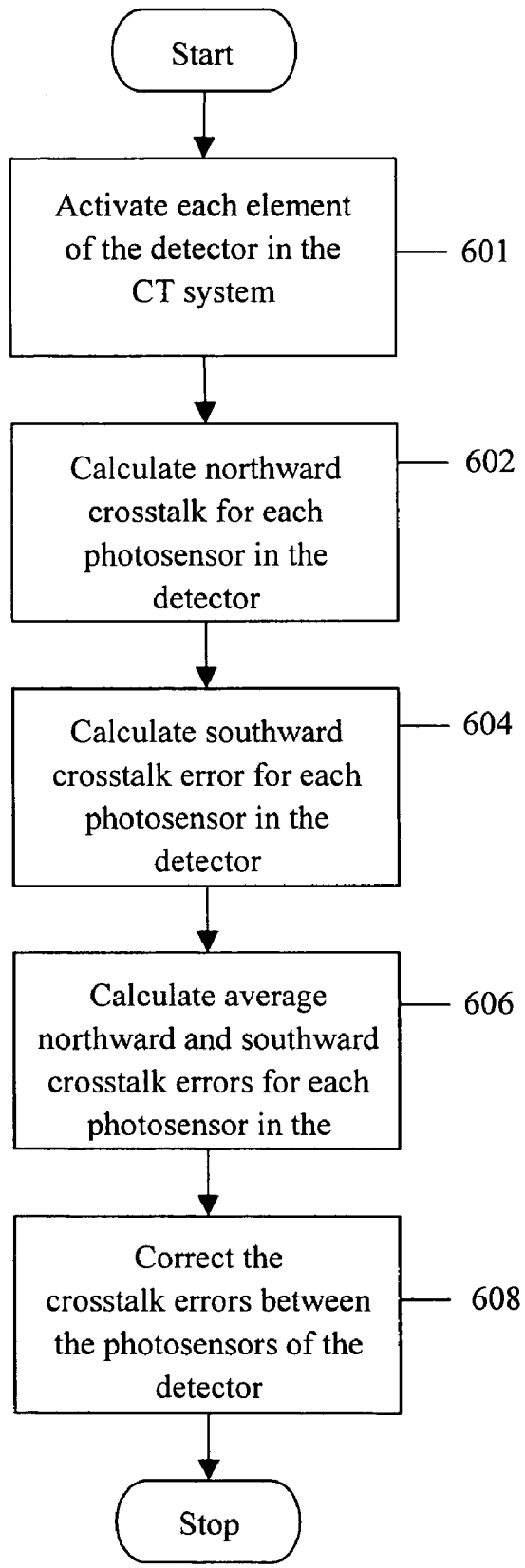
FIG. 4 is a flowchart of a method for calibrating a CT system for z-crosstalk errors in accordance with an exemplary embodiment of the invention.

FIG. 4 is a flowchart of a method for calibrating a CT system 300 for z-crosstalk errors, in accordance with an exemplary embodiment of the invention. Specifically, the flowchart describes a method for measuring the z-crosstalk error values for each photosensor in elements 326 of detector 320, and using these z-crosstalk error values for correcting for z-crosstalk. At 601, each element 326 of detector 320 is selectively activated by X-rays. At 602, the northward z-crosstalk error values for each photosensor in detector 320 are calculated. At 604, the southward z-crosstalks for each photosensor of detector 320 are calculated. At 606, average northward and southward z-crosstalk error values for each photosensor in detector 320 are calculated. At 608, the average northward and southward z-crosstalk error values are used for the correction of the z-crosstalk between the photosensors in elements 326 of detector 320.

In various embodiments of the invention, the measurement of the z-crosstalk error values is performed in a pre-test bay before the CT image of object 336 is taken. These z-crosstalk error values are used for the correction of the z-crosstalk and for the calibration of CT system 300.

Figure 5:
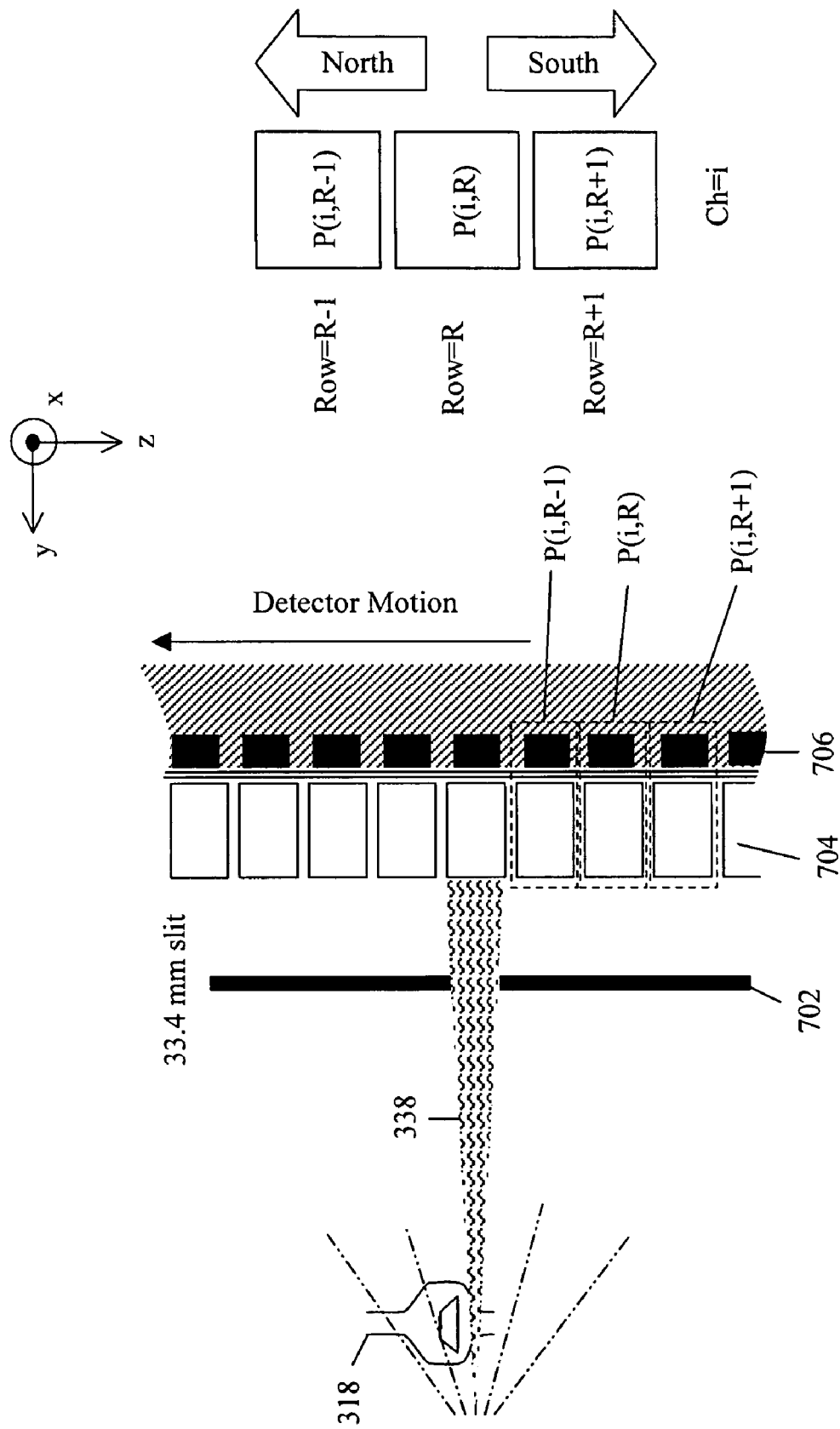
FIG. 5 is a diagram illustrating a setup of a pre-test bay that is used for the measurement of z-crosstalk errors in accordance with FIG. 3 and FIG. 4.

FIG. 5 illustrates a setup of a pre-test bay for the measurement of z-crosstalk error values for the photosensors in a channel in detector 320 in accordance with FIG. 3 and FIG. 4. As shown, the setup includes X-ray source 318, X-ray beam 338, a slit 702, and elements 326. In an embodiment of the invention, slit 702 may be replaced by a pinhole. Each element 326 includes a scintillator crystal 704 and a photosensor 706. Detector 320 includes a plurality of photosensors similar to photosensor 706, which are hereinafter referred to as photosensors 706. The same process is applicable for crosstalk correction in the channel direction (x direction) as well as in the diagonal direction (between x and z direction).

A channel 'i' with R+1 rows of elements 326 are provided. Element 326 in channel 'i' and row 'R' is hereinafter referred to as P(i,R). Similarly, element 326 in channel 'i' and row 'R+1' is hereinafter referred to as P(i,R+1), and element 326 in channel 'i' and row 'R−1' is hereinafter referred to as P(i,R−1). Channel 'i' includes, but is not limited to, element P(i,R) between elements P(i,R+1) and P(i,R−1).

In an embodiment of the invention, the direction from P(i,R) to P(i,R−1) is North and the direction from P(i,R) to P(i,R+1) is South. Further, the North and the South directions lie along the z coordinate axis. In an exemplary embodiment of the invention, each row of elements 326 is along the z direction, and each channel of elements 326 is along the x direction.

Slit 702 is moved along each element 326 in channel 'i', in order to measure the crosstalk for each element 326 in that channel 'i'. X-ray beam 338 is focused on, for example, P(i,R) through slit 702. However, XX-ray beam 338 is absorbed partially by photosensor 706 in P(i,R) and a portion of the radiation is transferred to photosensors 706 in adjacent or neighboring elements P(i,R−1) and P(i,R+1), in the North and South directions, respectively and in X-direction as well (P(i−1,R) and P(i+1,R)).

In an embodiment of the invention, slit 702 has a width equivalent to the pixel size and each element is in the shape of a cube having sides of 0.625 mm according to International Organization for Standardization (ISO) standards.

Figure 6:
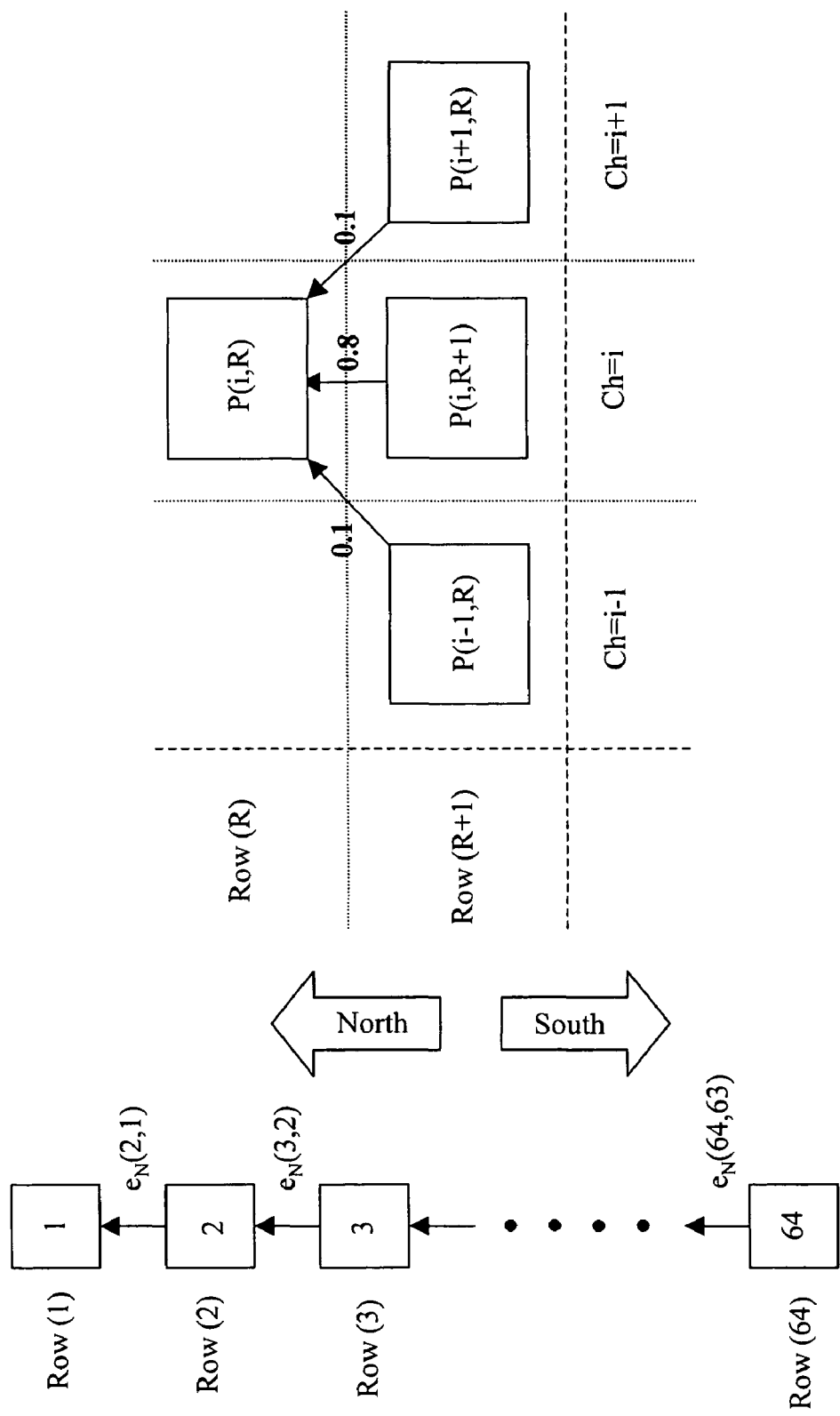
FIG. 6 is a diagram illustrating calculating northward z-crosstalk error values in accordance with various embodiments of the invention.

FIG. 6 illustrates a method for calculating the northward z-crosstalk error values for photosensors 706 present in channel 'i' of elements 326 in detector 320, in accordance with various embodiments of the invention.

X-ray radiations directed on and detected by P(i,R), P(i−1,R), and P(i+1,R), also may be detected by P(i,R−1). In various embodiments of the invention, 80% of the signal intensity at P(i,R−1) is from adjacent element P(i,R), and 10% of the signal intensity is from diagonal elements P(i−1,R), and P(i+1,R). Therefore, while calculating the northward z-crosstalk error for P(i,R), only 80% the signal intensity at P(i,R−1) is considered. Thus, the southward z-crosstalk error for P(i,R) is calculated by the following equation:

$$e_N\left[\left(100 * \frac{\text{Signal}(i, R-1)}{\text{Signal}(i, R)}\right) * 0.8\right] \qquad (1)$$

In an embodiment of the invention, 'i' varies based on the number of elements 326, for example, from 1 to M, wherein M is the number of channels in the detector and R varies based on the number of element slices, for example, from 1 to 64. The northward z-crosstalk on other elements 326 is calculated using equation 1 by varying 'i' and 'R'.

Figure 7:
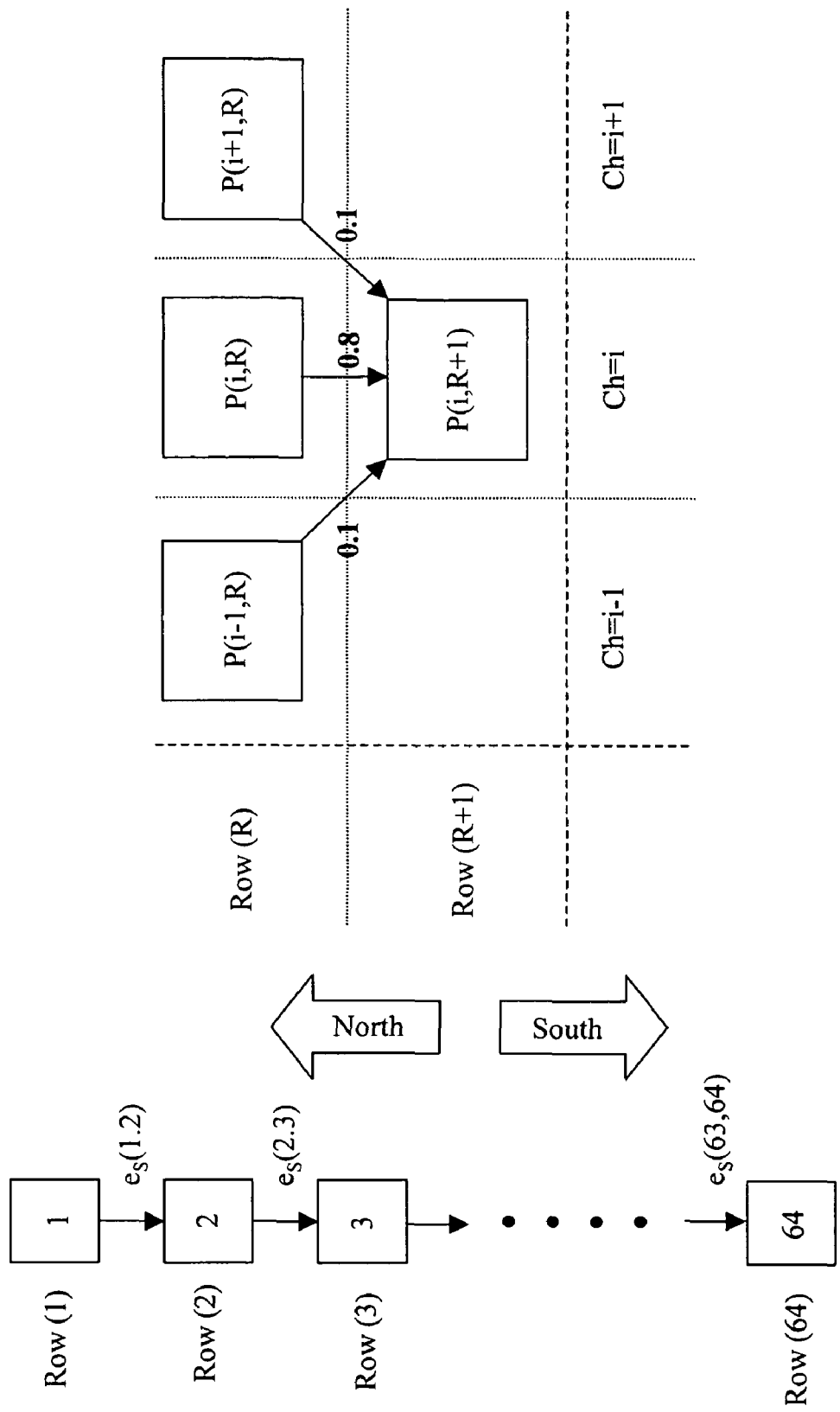
FIG. 7 is a diagram illustrating calculating southward z-crosstalk error values for photosensors in accordance with various embodiments of the invention.

FIG. 7 illustrates a method for calculating the southward z-crosstalk error values for photosensors 706 in channel 'i' of elements 326 in detector 320, in accordance with various embodiments of the invention.

X-ray radiations directed on and detected by photosensors 706 of P(i,R), P(i−1,R), and P(i+1,R) also may be detected by P(i,R+1). For example, 80% of the contribution may be from adjacent element P(i,R) and 10% contribution each from diagonal elements P(i−1,R), and P(i+1,R). Therefore, while calculating the southward z-crosstalk error for P(i,R), only 80% the signal intensity at P(i,R+1) is considered. Thus, the southward z-crosstalk error for P(i,R) is calculated by the following equation:

$$e_S = \left[\left(100 * \frac{\text{Signal}(i, R+1)}{\text{Signal}(i, R)}\right) * 0.8\right] \qquad (2)$$

In an embodiment of the invention, 'i' varies from 1 to M, wherein M is the number of detector channels and R varies from 1 to 64. The southward z-crosstalk on other elements 326 is calculated using equation 2 by varying 'i' and 'R'.

Figure 8:
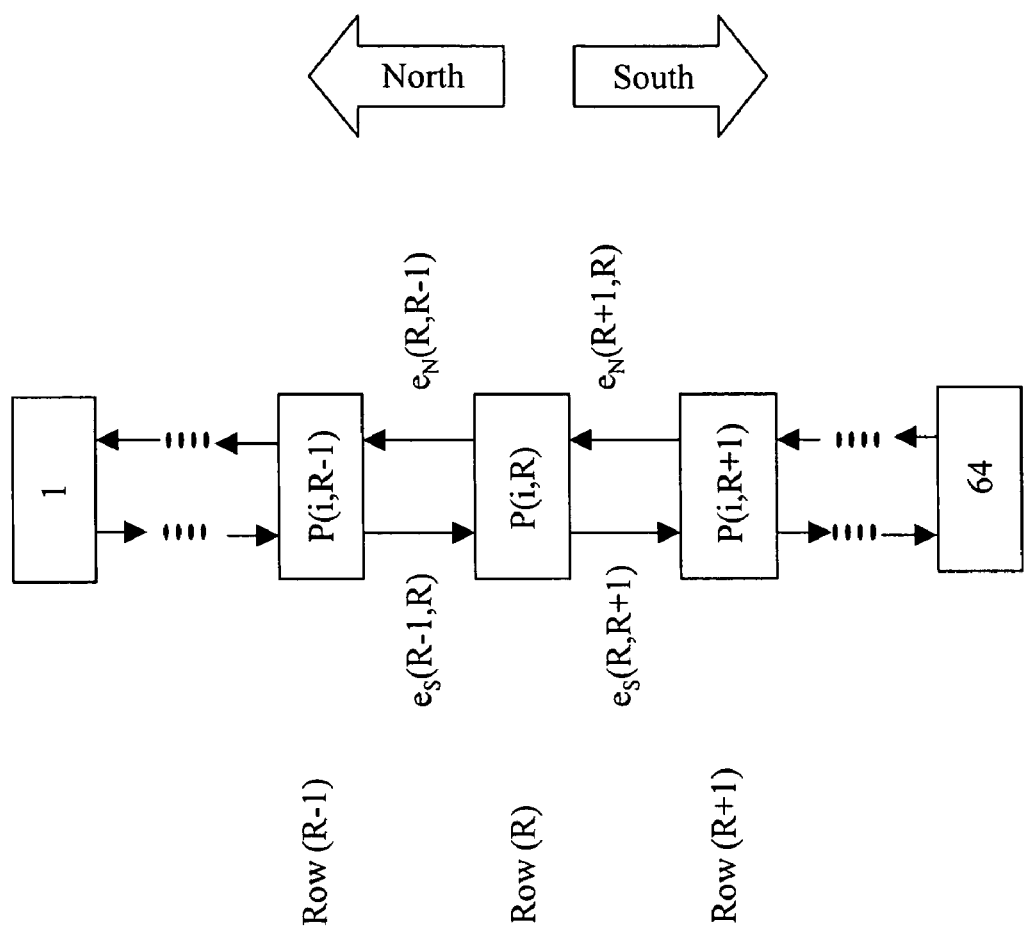
FIG. 8 is a diagram illustrating z-crosstalk error values in northward and southward directions for photosensors in accordance with various embodiments of the invention.

FIG. 8 illustrates the z-crosstalk error values in northward and southward directions for photosensors 706 present in channel 'i' of elements 326 of detector 320, in accordance with various embodiments of the invention.

FIGS. 9 and 10 are tables illustrating collated sample z-crosstalk error values for the northward and southward directions, respectively, in accordance with FIG. 6 and FIG. 7. Each row of elements 326 is referred to as a slice. According to equation 1, the northward z-crosstalk error value in each element 326 in slice 1 will be zero. According to equation 2, the southward z-crosstalk error value in each element 326 in slice 64 will be zero.

The northward z-crosstalk error values over all photosensors 706 are used "as is" or averaged to obtain average northward z-crosstalk error $e_N$ and the southward z-crosstalk error values over all photosensors 706 are used "as is" or averaged to obtain average southward z-crosstalk error $e_S$. These average z-crosstalk error values are used to correct the z-crosstalks for all photosensors 706 in detector 320 during the generation of the CT image of object 336.

The correction of the northward and southward z-crosstalks may be provided according to various embodiments and as described below.

Figure 11:
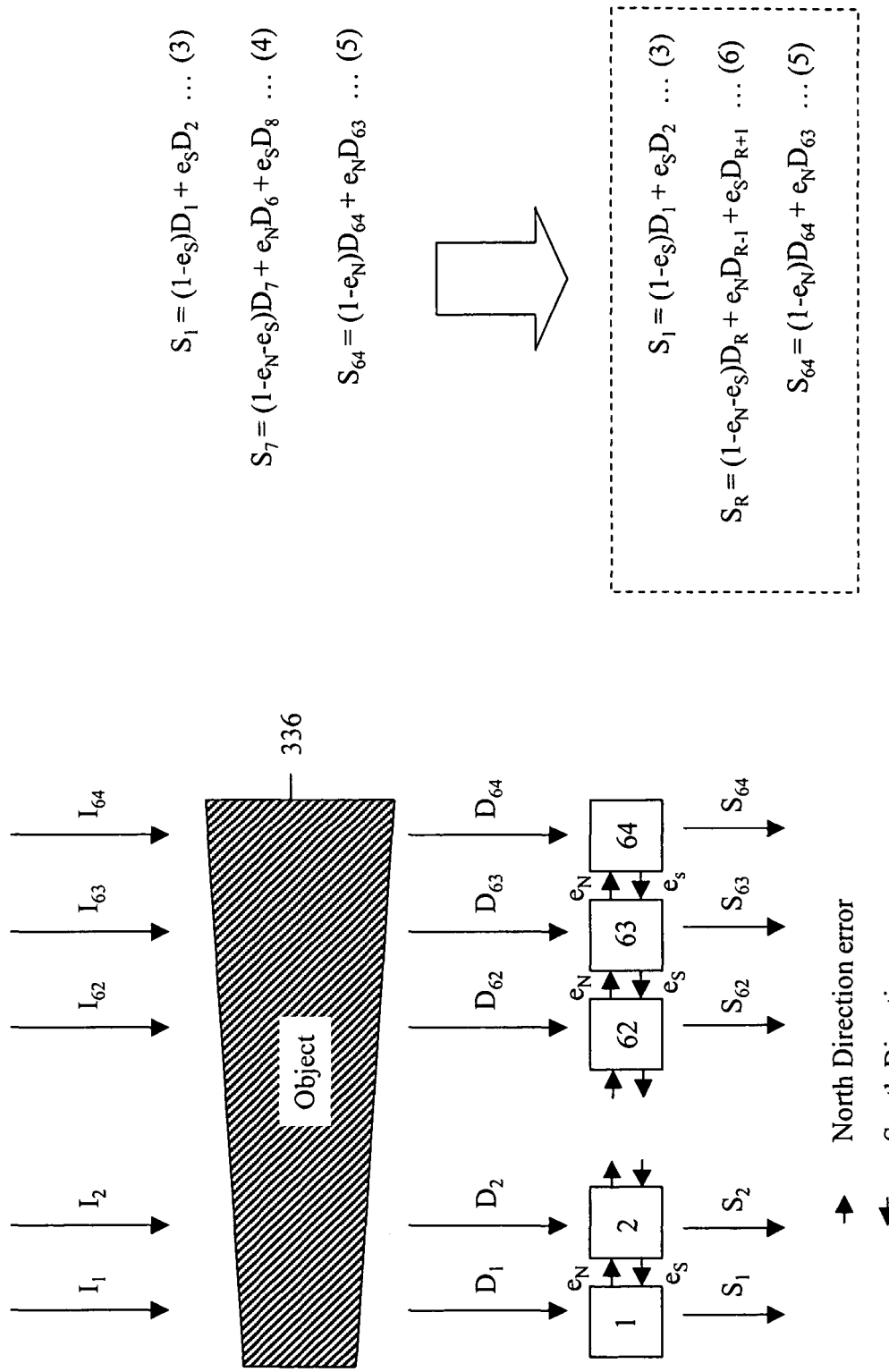
FIG. 11 is a diagram illustrating a first algorithm for calibrating a CT system in accordance with various embodiments of the invention.

FIG. 11 illustrates a first algorithm for correcting CT system 300, in accordance with various embodiments of the invention. The algorithm corrects of the z-crosstalk for photosensors 706 in a channel having 64 elements 326, which are hereinafter referred to as elements 1-64. Further, each element 326 is hereinafter referred to as element R, wherein R ranges from 1 through 64. In alternate embodiments of the invention, the algorithm may be used to calculate the correction for more than or less than 64 elements 326 in a channel of elements 326.

As shown in FIG. 11, X-ray beams 338 with initial intensities $I_1$ to $I_{64}$ ($I_1$-$I_{64}$) impinge on and are attenuated by object 336 (shown in FIG. 1). After passing through object 336, attenuated X-ray beams are received by elements 1-64, respectively, and have collection vector intensities $D_1$ to $D_{64}$ ($D_1$-$D_{64}$), respectively.

The collection vector intensities $D_1$-$D_{64}$ do not include crosstalk at elements 1-64. Due to the z-crosstalk in the northward and southward directions between elements 1-64, elements 1-64 emit measured intensities $S_1$ to $S_{64}$ ($S_1$-$S_{64}$), respectively. The average z-crosstalk error values $e_N$ and $e_S$ are used for determining collection vector intensities $D_1$-$D_{64}$ using measured intensities $S_1$-$S_{64}$.

$S_1$ for element 1 is a function of $D_1$ and $D_2$ and is represented by the following equation:

$$S_1 = (1-e_S)D_1 + e_S D_2 \qquad (3)$$

$S_7$ for element 7 is a function of $D_6$, $D_7$ and $D_8$ and is represented by the following equation:

$$S_7 = (1-e_N-e_S)D_7 + e_N D_6 + e_S D_8 \qquad (4)$$

Finally, $S_{64}$ for element 64 is a function of $D_{63}$ and $D_{64}$ and is represented by the following equation:

$$S_{64} = (1-e_N)D_{64} + e_N D_{63} \qquad (5)$$

Using equations 3, 4 and 5, the $S_R$ for elements 2-63 is calculated using the following equation:

$$S_R = (1-e_N e_S)D_R + e_N D_{R-1} + e_S D_{R+1} \qquad (6)$$

Finally, equations relating each S value with each corresponding D value are written in form of the z-crosstalk matrix equation $[S]=[\epsilon]*[D]$.

This matrix equation is de-convolved to obtain the collection vector intensities $D_1$-$D_{64}$. This matrix equation is de-convolved in order to obtain the collection vector intensities values that would have been obtained if there was no crosstalk between photosensors 706 in elements 326 of detector 320.

FIG. 12 illustrates a z-crosstalk matrix in accordance with various embodiments of the invention. The matrix needs to be solved to determine the collection vector intensities $D_1$-$D_{64}$ before the crosstalk is determined. The collection vector intensities $D_1$-$D_{64}$ are the crosstalk corrected X-ray signals to be used in the reconstruction of the CT images.

A second algorithm provides an approximate correction of the z-crosstalk error values between photosensors 706 in elements 326 of detector 320.

Figure 13:
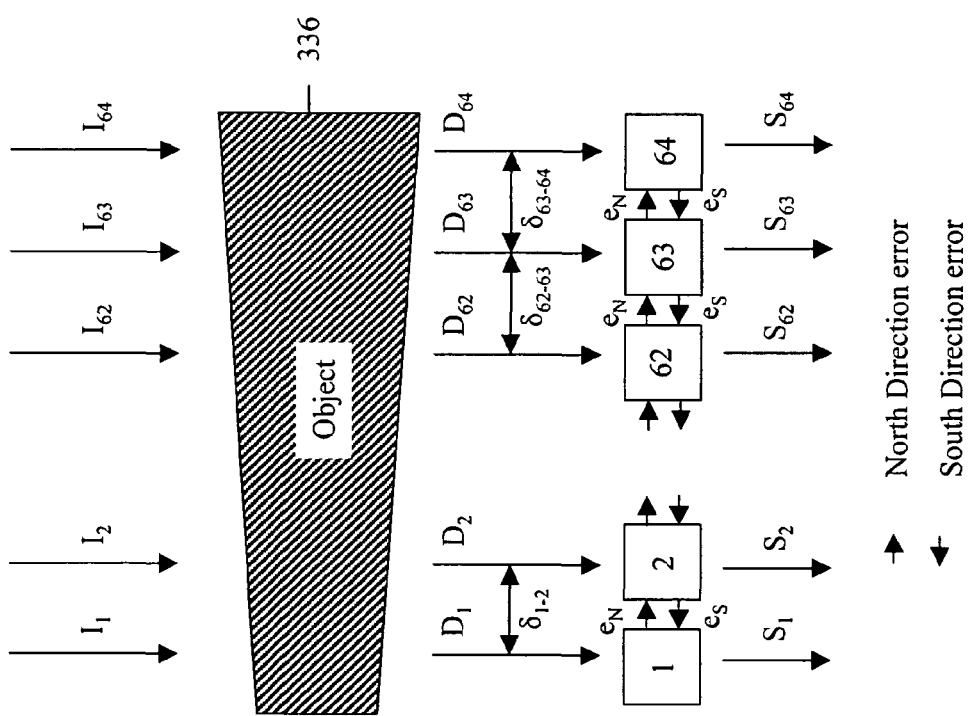
FIG. 13 is a diagram illustrating a second algorithm for calibrating a CT system 300 in accordance with various embodiments of the invention.

FIG. 13 illustrates a second algorithm for calibrating CT system 300, in accordance with various embodiments of the invention. Specifically, the second algorithm describes a method for the correction of z-crosstalk in order to calibrate CT system 300.

The correction of elements 1-64 is calculated using this algorithm. However, this algorithm may be used to calculate the correction for more than or less than 64 elements in a channel of elements 326.

As shown, X-ray beams 338 with initial intensities $I_1$-$I_{64}$ impinge on and are attenuated by object 336 (shown in FIG. 1). After passing through object 336, attenuated X-ray beams are received by elements 1-64, and have collection vector intensities $D_1$-$D_{64}$, respectively.

The collection vector intensities $D_1$-$D_{64}$ are the intensities that impinge on elements 1-64, respectively, before the z-crosstalk correction is performed. Due to z-crosstalk in the northward and southward directions between elements 1-64, elements 1-64 finally absorb measured intensities $S_1$-$S_{64}$, respectively. The average z-crosstalk error values $e_N$ and $e_S$ are used for determining collection vector intensities $D_1$-$D_{64}$ using measured intensities $S_1$-$S_{64}$. Further, for elements R and R+1, $\delta_{R(R+1)}$ represents the ratio of difference between collection vector intensities $D_R$ and $D_{R+1}$, and $D_R$. In various embodiments of the invention, the average z-crosstalk error values $e_N$ and $e_S$, and $\delta_{R(R+1)}$ are used for correcting the z-crosstalk between elements 1-64.

$D_1$ for element 1 is a function of $S_1$, $\delta_{1-2}$, $e_N$ and $e_S$ is represented by the following equations:

$$S_1 = D_1 + \delta_{1-2}(e_N - e_S)D_1 \qquad (7)$$

$$= (1 + \delta_{1-2}(e_N - e_S))D_1 \qquad (8)$$

Thus, $D_1$ is written as:

$$D1 = S_1/(1+\delta_{1-2}(e_N-e_S)) \qquad (9)$$

Similarly, $D_{63}$ for element 63 is a function of $S_{63}$, $\delta_{63-62}$, $\delta_{63-64}$, $e_N$ and $e_S$ is represented by the following equations:

$$S_{63} = D_{63} + (\delta_{63-62}e_N - \delta_{63-64}e_S)D_{63} \qquad (10)$$

$$= (1 + \delta_{63-62}e_N - \delta_{63-64}e_S))D_{63} \qquad (11)$$

$$D_{63} = S_{63}/(1 + \delta_{63-62}e_N - \delta_{63-64}e_S)) \qquad (12)$$

wherein in equation (7), $e_N$ is 0 and in equation (10) $e_S$ is 0.

Therefore, $D_R$ for element R is a function of $S_R$, $\delta_{R(R-1)}$, $\delta_{R(R+1)}$, $e_N$ and $e_S$ is represented by the following equations:

$$S_R = D_R + (\delta_{R(R-1)}e_N - \delta_{R(R+1)}e_S)D_R \qquad (13)$$

$$= (1 + \delta_{R(R-1)}e_N - \delta_{R(R+1)}e_S))D_R \qquad (14)$$

$$D_R = S_R/(1 + \delta_{R(R-1)}e_N - \delta_{R(R+1)}e_S)) \qquad (15)$$

$\delta_{RR+1}$ values are calculated using the following equation:

$$\delta_{R(R+1)} = (D_R - D_{R+1})/D_R \qquad (16)$$

In this case, $\delta_{R-(R+1)} = (D_R - D_{R+1})/D_R$ represents the signal gradient from two contiguous rows. For a flat anatomy where there is no slope, $\delta_{R-(R+1)}$ will be equal to zero and no crosstalk correction will be performed. However, if there is a slope in the anatomy, leading to different X-ray signals in two contiguous rows, then correction will be performed. Because $\delta_{R-(R+1)}$ is based on primary beam signals without crosstalk effects, $D_R$, an approximate value of $\delta_{R-(R+1)}$ can be calculated using the measured intensities $S_R$, which are the X-ray signals that are detected.

Therefore, measured intensities $S_1$-$S_{64}$ are used to calculate the approximate value of $\delta R(R+1)$, using the following approximate equation:

$$\delta_{R(R+1)} = (S_R - S_{R+1})/S_R \quad (17)$$

Thus, the collection vector intensities $D_1$-$D_{64}$ calculated by this algorithm provide an approximate correction of the crosstalk between photosensors 706 in detector 320. This algorithm is performed before the negative logarithm process in the pre-process flow, just after offset correction.

The first algorithm and the second algorithm are used for correcting artifacts induced due to z-crosstalk error values between photosensors 706 in detector 320. Further, these algorithms may be used to correct the x-crosstalk between photosensors 706 in detector 320.

Various embodiments of the invention allow for producing accurate CT images without any artifacts or smudges specially, the CT images objects with steep slopes such as liver and the tip of head.

Various embodiments of the invention do not need very accurate manual alignment of the scintillator crystals with the photosensors in order to obtain accurate images. In various embodiments, the z-crosstalk error values $e_N$ and $e_S$ are used to correct the collection vector intensities $D_1$-$D_{64}$. These error values are used to calibrate the CT system while performing image reconstruction.

One technical effect of the present invention is that accurate manual alignment of the scintillator crystals with the photosensors is not needed in order to obtain accurate images. Also, z-crosstalk error values $e_N$ and $e_S$ are used to correct the collection vector intensities $D_1$-$D_{64}$. These error values are used to calibrate the CT system while performing image reconstruction.

Although the various embodiments are described with respect to medical imaging, it should be understood that the various embodiments described herein are not limited to medical applications, but may be utilized in non-medical applications.

As used herein, an element or step recited in the singular and preceded with the word "a" or "an" should be understood as not excluding plural elements or steps, unless such exclusion is explicitly recited. Furthermore, references to "an" or "one" "embodiment" of the present invention are not intended to be interpreted as excluding the existence of additional embodiments that also incorporate the recited features. Also as used herein, the phrase "reconstructing an image" is not intended to exclude embodiments of the present invention in which data representing an image is generated, but a viewable image is not. However, many embodiments generate (or are configured to generate) at least one viewable image.

The various embodiments of the invention and components thereof may be implemented as part of a computer system. The computer system may include a computer, an input device, a display unit and an interface, for example, for accessing the Internet.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

While the invention has been described in terms of various specific embodiments, those skilled in the art will recognize that the invention can be practiced with modification within the spirit and scope of the claims.

What is claimed is:

1. A method for calibrating a computed tomography (CT) system, the method comprising:
   selectively activating each of a plurality of elements of a detector in the CT system;
   determining for each of the selectively activated elements, a crosstalk effect on elements adjacent to the activated elements, to calibrate the CT system, wherein the selectively activated elements are located in a plurality of different directions that include a first direction, a second direction that is opposite to the first direction, and a third direction that is different from the first and second directions, wherein the second direction is adjacent to the selectively activated elements; and
   determining a crosstalk corrected x-ray signal corresponding to one of the adjacent elements as a function of a ratio of a difference and a corrected vector intensity, wherein the difference comprises a difference between the corrected vector intensity of one selectively activated element and another corrected vector intensity corresponding to another one of the selectively activated elements.

2. A method in accordance with claim 1 wherein the selectively activating comprises selectively exciting individually each of the plurality of elements.

3. A method in accordance with claim 1 further comprising calculating calibration vectors based on the determined crosstalk corrected x-ray signal.

4. A method in accordance with claim 3 wherein the calculating comprises performing a de-convolution process for a matrix of determined scan values and determined crosstalk corrected x-ray signal values.

5. A method in accordance with claim 3 wherein the calculating comprises using approximate values.

6. A method in accordance with claim 1 further comprising correcting for the determined crosstalk corrected x-ray signal.

7. A method in accordance with claim 1 wherein each element comprises at least one pixel of the detector.

8. A method in accordance with claim 1 wherein the determining for each of the selectively activated elements comprises measuring the crosstalk effect between adjacent elements.

9. A method in accordance with claim 8 wherein the crosstalk effect comprises one of optical, light, electrical and X-ray crosstalk.

10. A method in accordance with claim 1 wherein the determining a crosstalk corrected x-ray signal comprises measuring an amount of signal generated in an element caused by X-rays absorbed in an adjacent row of elements.

11. A method in accordance with claim 1 wherein the selectively activating comprises selectively directing an X-ray source onto each of the plurality of elements using one of a pinhole source and a slit source.

12. A method in accordance with claim 1 further comprising determining the crosstalk effect on a plurality of elements in different directions of the detector.

13. A method in accordance with claim 1 further comprising calibrating the CT system based on the determining for each of the selectively activated elements to reduce channel to channel non-linearity variation.

14. A method in accordance with claim 1 wherein the determining for each of the selectively activated elements comprises measuring X-rays absorbed in adjacent elements.

15. A method in accordance with claim 1 wherein the determining the crosstalk effect comprises measuring a level of response in adjacent elements.

16. A method in accordance with claim 1, wherein the third direction includes a diagonal direction between the first direction and a fourth direction perpendicular to the first direction.

17. A method for calibrating a computed tomography (CT) system, the method comprising:
receiving measured signal information corresponding to each of a plurality of elements of the CT system;
receiving measured crosstalk signal information corresponding to the plurality of elements of the CT system, wherein the measured crosstalk signal information comprises information relating to signals received from a first subset of the elements adjacent a second subset of the elements that are selectively activated, wherein the selectively activated elements are located in a plurality of different directions that include a first direction, a second direction that is opposite to the first direction, and a third direction that is different from the first and second directions, wherein the second direction is adjacent to the selectively activated elements; and
determining collection vectors for calibrating the CT system based on the received measured signal information and received measured crosstalk signal information, wherein said determining collection vectors comprises determining a crosstalk corrected x-ray signal corresponding to one of the elements within the first subset as a function of a ratio of a difference and a corrected vector intensity, wherein the difference comprises a difference between the corrected vector intensity of one of the elements selectively activated within the first subset and another corrected vector intensity corresponding to one of the elements selectively activated within the second subset.

18. A method in accordance with claim 17 wherein the determining collection vectors comprises de-convolving a matrix of the received measured signal information and the received measured crosstalk signal information.

19. A method in accordance with claim 17 wherein the measured crosstalk signal information comprises one of optical, light, electrical and X-ray crosstalk information.

20. A computed tomography (CT) system comprising:
an image acquisition component including at least one detector having a plurality of elements;
a controller configured to selectively activate each of the plurality of elements of the at least one detector; and
a processor configured to:
determine for each of the selectively activated elements, a crosstalk effect on adjacent elements of the at least one detector, to calibrate the image acquisition component, wherein the selectively activated elements are located in a plurality of different directions that include a first direction, a second direction that is opposite to the first direction, and a third direction that is different from the first and second directions, wherein the second direction is adjacent to the selectively activated elements; and
determine a crosstalk corrected x-ray signal corresponding to one of the adjacent elements as a function of a ratio of a difference and a corrected vector intensity, wherein the difference comprises a difference between the corrected vector intensity of one selectively activated element and another corrected vector intensity corresponding to another one of the selectively activated elements.

* * * * *